UNITED STATES PATENT OFFICE.

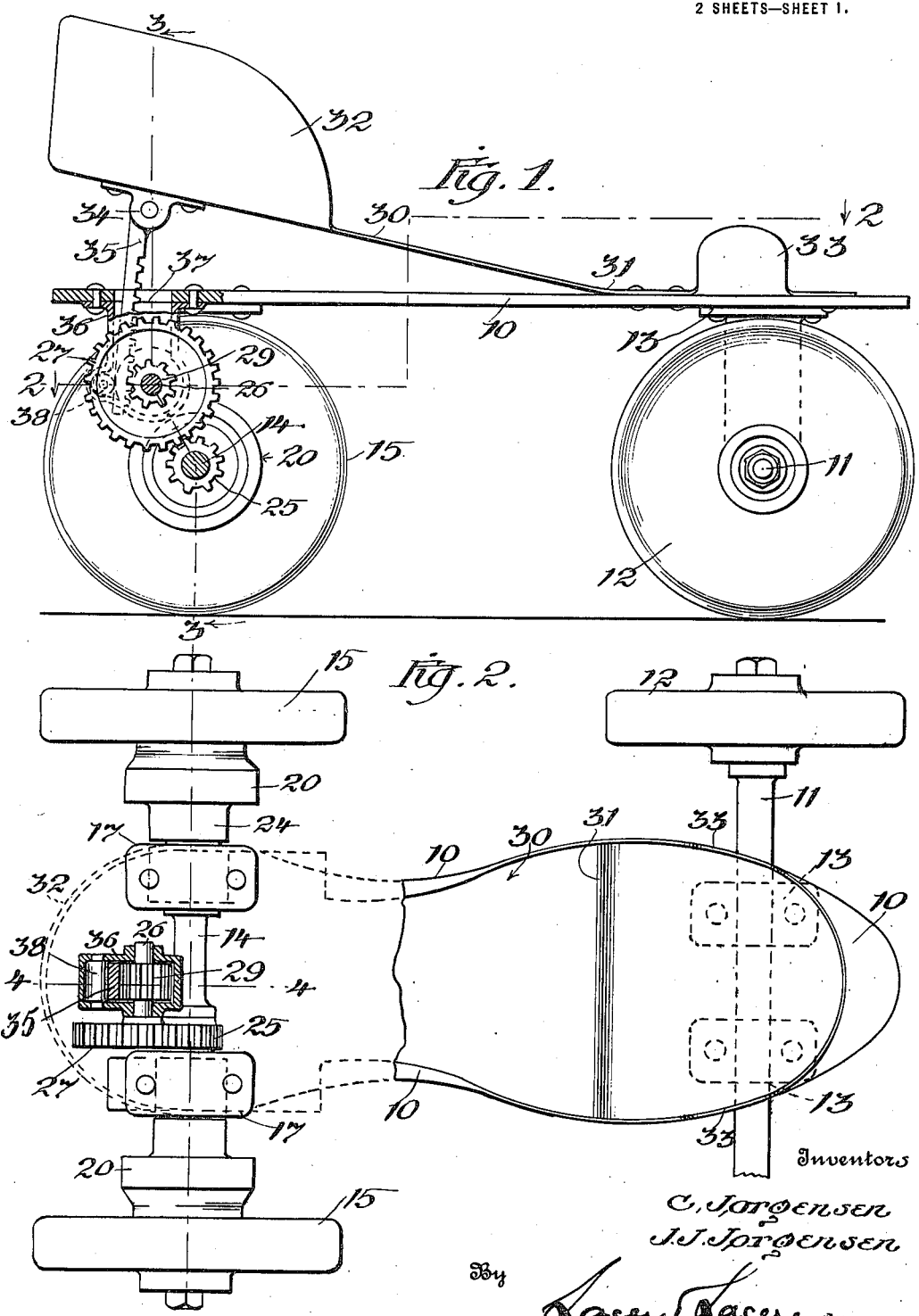

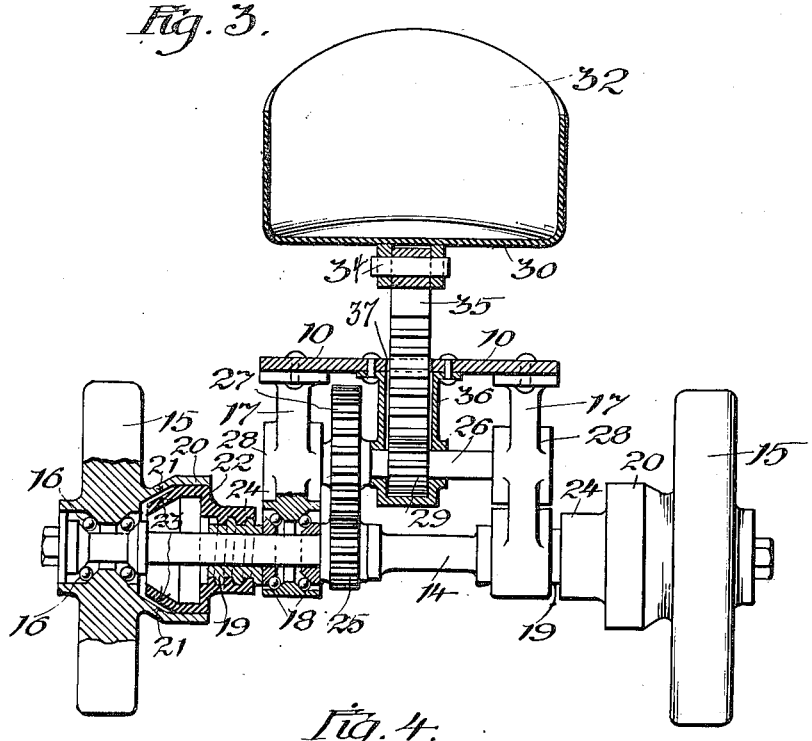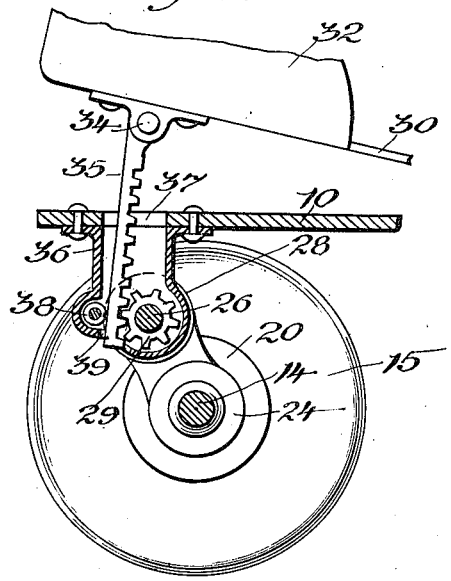

CLEAH JORGENSEN AND JOHN J. JORGENSEN, OF PORTLAND, OREGON, ASSIGNORS OF ONE-THIRD TO WILLARD R. LITTLE, OF PORTLAND, OREGON.

ROLLER-SKATE.

1,299,578.  Specification of Letters Patent.  Patented Apr. 8, 1919.

Application filed April 6, 1918. Serial No. 227,107.

*To all whom it may concern:*

Be it known that we, CLEAH JORGENSEN and JOHN J. JORGENSEN, subjects of Christian the Tenth of Denmark, residing at Portland, in the county of Multnomah and State of Oregon, have invented certain new and useful Improvements in Roller-Skates, of which the following is a specification.

This invention relates to improvements in roller skates and has for one of its objects to provide a device of this character having means whereby the weight of the wearer is utilized to transmit motion to the axle of one pair of the rollers or bearing wheels.

Another object of the invention is to provide a device of this character whereby the downward movement of the weight of the wearer will transmit rotary motion to one pair of the rollers and means whereby the release of the weight will cause the operating mechanism to return to initial position.

With these and other objects in view, the invention consists in certain novel features of construction, as hereinafter shown and described and then specifically pointed out in the claims; and in the drawings illustrative of the preferred embodiment of the invention—

Figure 1 is a side elevation partly in section of the improved device.

Fig. 2 is a plan view with a portion of the foot engaging member broken away and a portion of the mechanism in section on the line 2—2 of Fig. 1.

Fig. 3 is a vertical elevation in section on the line 3—3 of Fig. 1.

Fig. 4 is a detail view in section on the line 4—4 of Fig. 2.

The improved device includes a supporting body 10 and a forward axle 11 supporting the forward bearing wheels or rollers 12, the axle being coupled to the body by suitable standards 13. The forward bearing wheels will preferably be provided with suitable ball bearings, not illustrated, as they form no part of the present invention.

The rear axle is represented at 14 and supports the rear bearing wheels 15, the latter being provided with ball bearings, one set of which is indicated at 16. The axle 14 is connected to the body 10 by standards 17 each provided with suitable ball bearings, one set of which is indicated at 18. Rigidly mounted upon the axle 14 are threaded sleeves, one of which is illustrated at 19. Extending inwardly from each of the wheels or rollers 15 is a clutch casing 20 having an internal tapering clutch face 21. Mounted for rotation over the axle 14 is an opposing clutch casing or sleeve 22 having a tapering friction face 23 to engage the tapering face 21 of the sleeve 20 when the member 22 is moved longitudinally of the axle. Extending from the member 22 is a tubular projection 24 internally threaded as represented at the left in Fig. 3 to correspond to and engage the threads of the member 19. An effectual clutch device is thus formed between each of the rollers 15 and the axle. It will be obvious by this arrangement that when the axle is rotated in one direction the threaded member 19 will move the inner clutch member 22 into engagement with the outer clutch member 20 and thus couple the rollers 15 to the axle, and when the axle is rotated in the opposite direction the threaded members 19 will withdraw the inner clutch member from engagement with the outer clutch member. Rigidly coupled to the axle 14 is a gear pinion 25, and mounted for rotation through the standards 17 is a counter shaft 26 carrying a gear wheel 27 in constant engagement with the pinion 25. The standards 17 are provided with casings 28 inclosing the journals of the counter shaft 26, the casing inclosing suitable ball bearings, not illustrated, as they form no form of the present invention. Mounted upon the counter shaft 26 is a pinion 29. Connected rigidly to the forward portion of the support 10 is a plate 30 of resilient metal, preferably steel and disconnected at its rearward portion from the member 10. The member 30 is thus provided with a yieldable or resilient joint at the juncture of the attached portion and the free or movable portion, this joint being located at the point 31. A heel inclosing member 32 rises from the plate 30 at its free end, while toe guards 33 rise from the member 30 near its forward or attached end. The foot of the wearer is held in position by the members 32—33, so that the weight of the wearer can be applied to the movable portion of the plate 30, and when the weight is removed by elevating the foot the resiliency of the member 30 will cause the heel-engaging portion of the plate to rise and follow the foot of the wearer. Pivoted at 34 to the member 30 is a rack bar 35 with its teeth in constant engagement with the pinion 29. The pinion 29 is inclosed in a casing 36 attached to the under face of the body 10, the body having a slot represented at 37 through which the rack bar operates. Preferably a bearing roller 38 will be mounted through the casing 36 and bearing constantly against the rack bar to reduce the friction. The casing 36 is provided with slot 39 through which the rack bar moves when operated. The plate 30 will possess sufficient resiliency to maintain it in its upward position as shown in Figs. 1 and 4 with the rack bar 35 in its upper position, and the mechanism is so arranged that when the rack bar and plate are in their upward position, the threaded members 19 will hold the inner clutch members 22 disconnected from engagement with the clutch members 20, and then when the weight of the wearer of the skate is imparted to the plate 30 the rack bar will be depressed and rotate the axle and the threaded members 19 and cause the inner clutch members to be engaged with the outer clutch members and thus communicate the motion of the axle to the wheels or rollers 15, and when the weight of the wearer is removed from the plate 30 the resiliency of the plate will cause the rack bar to move in the opposite direction and thus withdraw the inner clutch members from engagement with the outer clutch members and correspondingly release the bearing wheels or rollers.

In operating the improved device the wearer in pushing the skate attached to one foot forwardly naturally permits his weight to depress the plate 30 and impart the forward motion to the rear bearing wheels, and then as the skate attached to the other foot is drawn forwardly in the action of skating the weight is transferred to the other skate and the weight removed from the first-mentioned skate with the result of releasing the clutch device of the bearing wheels. Thus the bearing wheels of the skates are alternately coupled and uncoupled from the axles and cause the skates to be forcibly moved forwardly with the effort of the wearer. The fatigue necessary to actuate the skates is thus very much lessened and the speed materially accelerated.

The wheels 12—15 may be of any required size, and may be larger than the ordinary skate rollers.

The improved device is simple in construction, can be manufactured at a slightly increased cost over the ordinary roller skates, and very much increases the force, power, and speed of the latter.

Having thus described the invention, what is claimed as new is:

1. A roller skate including a supporting body, standards depending from the supporting body, an axle journaled in the standards, bearing rollers loosely mounted on the axle and provided with relatively stationary clutch members, threaded sleeves rigidly secured to the axle, longitudinally movable clutch members having threaded portions engaging the threads on the sleeves, a pinion secured to the axle, a stub shaft journaled in the standards and provided with a gear meshing with the pinion on the axle, a pinion on the stub shaft, and a depressible foot piece having a depending rack, the teeth of which mesh with the pinion on the stub shaft for rotating the axle to cause the clutch members to interengage when said foot piece is depressed.

2. A roller skate including a supporting body, standards depending from the supporting body, an axle journaled in said standards, bearing rollers loosely mounted on the axle, relatively stationary clutch members carried by the bearing rollers, longitudinally movable clutch members mounted on the axle, a casing depending from the supporting body and having its upper end open and registering with an opening in the supporting body, a stub shaft journaled in the standards and extending through the casing, a pinion disposed within the casing and secured to the stub shaft, a pinion on the axle, a gear secured to the stub shaft and engaging the pinion on the axle, a depressible foot piece secured to the supporting body, and a toothed rack depending from the depressible foot piece and engaging the teeth on the pinion in the casing for rotating the axle to cause the clutch members to interengage.

3. A roller skate including a supporting body, an axle, bearing rollers loosely mounted on the axle, relatively stationary clutch members carried by the bearing rollers, longitudinally movable clutch members mounted on the axle, a resilient depressible foot piece having its forward end rigidly secured to the supporting body and its rear end normally elevated above said body, and means depending from the elevated end of the foot piece and operatively connected with the axle for rotating said axle to cause the movable clutch members to engage the stationary clutch members.

In testimony whereof we affix our signatures.

CLEAH JORGENSEN.
JOHN J. JORGENSEN.